US009162631B2

(12) United States Patent
Stellabuto

(10) Patent No.: US 9,162,631 B2
(45) Date of Patent: Oct. 20, 2015

(54) COILED TUBING STORAGE DEVICE AND SYSTEM, AND METHOD OF USE THEREOF

(71) Applicant: Anthony T. Stellabuto, Laurel, MD (US)

(72) Inventor: Anthony T. Stellabuto, Laurel, MD (US)

( * ) Notice: Subject to any disclaimer, the term of this patent is extended or adjusted under 35 U.S.C. 154(b) by 0 days.

(21) Appl. No.: 14/446,142

(22) Filed: Jul. 29, 2014

(65) Prior Publication Data

US 2015/0034689 A1    Feb. 5, 2015

Related U.S. Application Data

(60) Provisional application No. 61/860,689, filed on Jul. 31, 2013.

(51) Int. Cl.
*B60R 11/06* (2006.01)
*B60R 11/00* (2006.01)

(52) U.S. Cl.
CPC ......... *B60R 11/06* (2013.01); *B60R 2011/0003* (2013.01)

(58) Field of Classification Search
CPC . B60R 11/06; B60R 2011/0003; A47F 7/146; A47F 7/147
USPC ......... 224/539–541, 543, 545, 547, 548, 564, 224/565; 211/11, 90.04; 296/24.44, 24.45, 296/37.6, 37.13
See application file for complete search history.

(56) References Cited

U.S. PATENT DOCUMENTS

| | | | | |
|---|---|---|---|---|
| 1,527,056 A * | 2/1925 | Martin | ......................... | 224/572 |
| 3,220,557 A * | 11/1965 | Brandes | ......................... | 211/40 |
| 3,481,485 A * | 12/1969 | Hess | ............................. | 211/134 |
| 4,162,014 A * | 7/1979 | Bobrick | ......................... | 211/50 |
| 4,588,094 A * | 5/1986 | Evans | ............................ | 211/55 |
| 5,016,760 A * | 5/1991 | Mayo | ............................. | 211/55 |
| 2014/0209551 A1* | 7/2014 | Hawkins | .................... | 211/90.04 |
| 2014/0252057 A1* | 9/2014 | Workman et al. | ............ | 224/557 |

* cited by examiner

*Primary Examiner* — Gregory Pickett
*Assistant Examiner* — Corey Skurdal
(74) *Attorney, Agent, or Firm* — Arent Fox LLP

(57) ABSTRACT

Devices, methods, and systems for storing a plurality of coiled tubes as well as features for storing or securing brazing rods and other similar items. One example such system/device is modular and includes a rack support and bin-like units for retaining and providing easy identification and access to coiled tubing, such as coiled copper tubing of differing diameters. In this example, the bin-like units are attached ladder-like so as to form adjacent, angled receptacles for different diameter tubing coils, such that each coil type is quickly visable and easily retrieved.

11 Claims, 6 Drawing Sheets

COILED TUBING STORAGE DEVICE AND SYSTEM, AND METHOD OF USE THEREOF

CROSS-REFERENCE TO RELATED APPLICATIONS

This application is based upon and claims the benefit of priority of U.S. Provisional Application No. 61/860,689, filed Jul. 31, 2013. The disclosure of the prior application is hereby incorporated in its entirety by reference.

FIELD OF THE INVENTION

Aspects of the present invention relate to the field of devices and systems for storing tubing, such that the tubing is easily stored and retrieved, as well as features for storing or securing brazing rods and other similar items, while also being protected from damage and other hazards, and particularly to devices and systems that are mountable in a vehicle.

BACKGROUND OF THE INVENTION

There remains an unmet need for devices, methods, and systems for easily and safely storing tubing, such as coiled copper tubing and brazing rods, including, for example, such storage in vehicles (e.g., service vehicles), where the devices/methods and systems save space, protect such tubing from damage, and allow easy identification, storage, and retrieval of the tubing.

SUMMARY OF THE INVENTION

Aspects of the present invention relate to devices, methods, and systems for providing storage of tubing, such as coiled copper or other tubing, as well as brazing rods and other similar items, as typically used, for example, in electrical, mechanical, and other construction and maintenance service industries.

One example variation in accordance with aspects of the present invention provides a modular system that includes a rack support and bin-like units for retaining and providing easy identification and access to coiled tubing, such as coiled copper tubing of differing tube cross-sectional diameters. In this example, the bin-like units are attached ladder-like so as to form adjacent, angled receptacles for different overall coil diameters, in a manner such that each tube/coil type is quickly visible and easily retrieved. In addition, the separate bins protect each coil contained therein, by separating the coils and preventing scratching, denting, and other damage that may occur among coils as may otherwise occur when stored in the manner of the prior art (e.g., stacking coils; roping or otherwise attaching coils to one another and to a hook or hooks in a vehicle).

In this example variation in accordance with aspects of the present invention, the rack support may, for example, be secured within a vehicle (e.g., by attachment to a wall within the vehicle), and the bin-like units (also interchangeably referred to herein as "receiving troughs") may be attached to the rack support, such as by securing the units by nuts and bolts, or by other suitable methods and devices, such as via one or more tabs extending from portions of the bins being inserted into corresponding receiving opening(s) in the rack support. In addition, the number and size of the bins may be assembled in a modular fashion, such that only the required number of bins is created, as needed, and so that assembly and disassembly is facilitated.

In yet another variation, rather than the system being modular, the system may be formed or assembled as a non-modular unit, and secured within the vehicle as appropriate.

In yet another variation, the modular or non-modular system may be used in other locations than within vehicles (e.g., within a store or storage area).

In addition to the rack and bin features for tubing storage, example aspects of the system may also optionally include one or more other mountable storage features, such as retaining features for securing brazing rod containers.

Additional advantages and novel features relating to aspects of the present invention will be set forth in part in the description that follows, and in part will become more apparent to those skilled in the art upon examination of the following or upon learning by practice thereof.

BRIEF DESCRIPTION OF THE DRAWINGS

Aspects of the present invention will become fully understood from the detailed description given herein below and the accompanying drawings, which are given by way of illustration and example only and thus not limited with respect to aspects of the present invention, wherein.

DETAILED DESCRIPTION

Aspects of the present invention relate to devices, methods, and systems for providing storage of tubing, such as coiled copper or other tubing, as well as features for storing or securing brazing rods and other similar items, typically used in electrical, mechanical, and other construction and maintenance areas.

Figure 1:
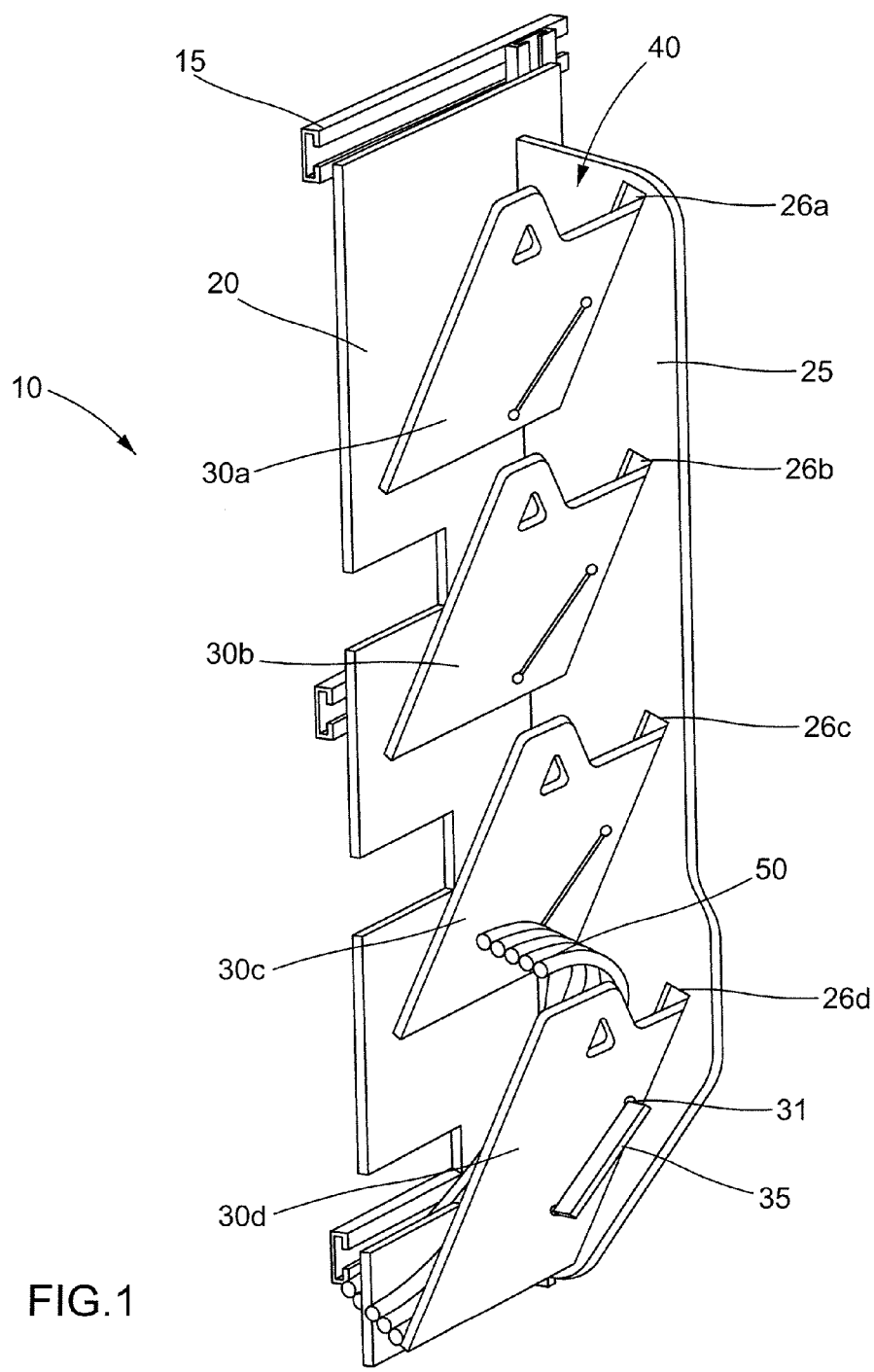
FIG. 1 shows a representative partial cutaway first perspective view of an example coiled tubing storage device/system, in accordance with aspects of the present invention.

FIG. 1 shows a representative, partial cutaway first perspective view of an example coiled tubing storage device/system, in accordance with aspects of the present invention. As shown in FIG. 1, the device/system 10 may include one or more rack support features 15, which may also include, for example, a rear support feature 20. Attachable to the rear support feature 20 may be one or more side structures 25. A plurality of shelf structures 30a-30d may be supported via one or more of the one or more side structures 25 and/or the rear support feature 20.

For example, in FIG. 1, the shelf structures 30a-30d may be supported via two side structures 25 (the second side structure to the one visible in FIG. 1 also being attached to the rear support feature 20 near an opposite edge, located horizontally relative to the attachment position of the rear support feature 20, as shown in FIG. 1), via, for example, one or more slotted receiving openings 26a-26d, or other securing features. In this example, open-topped bin-like units 40 are thereby formed by the combination of a portion of the rear support feature 20, a portion of each of the side structures 25, and at least a portion of the shelf structures 30a-30b.

Figure 2:
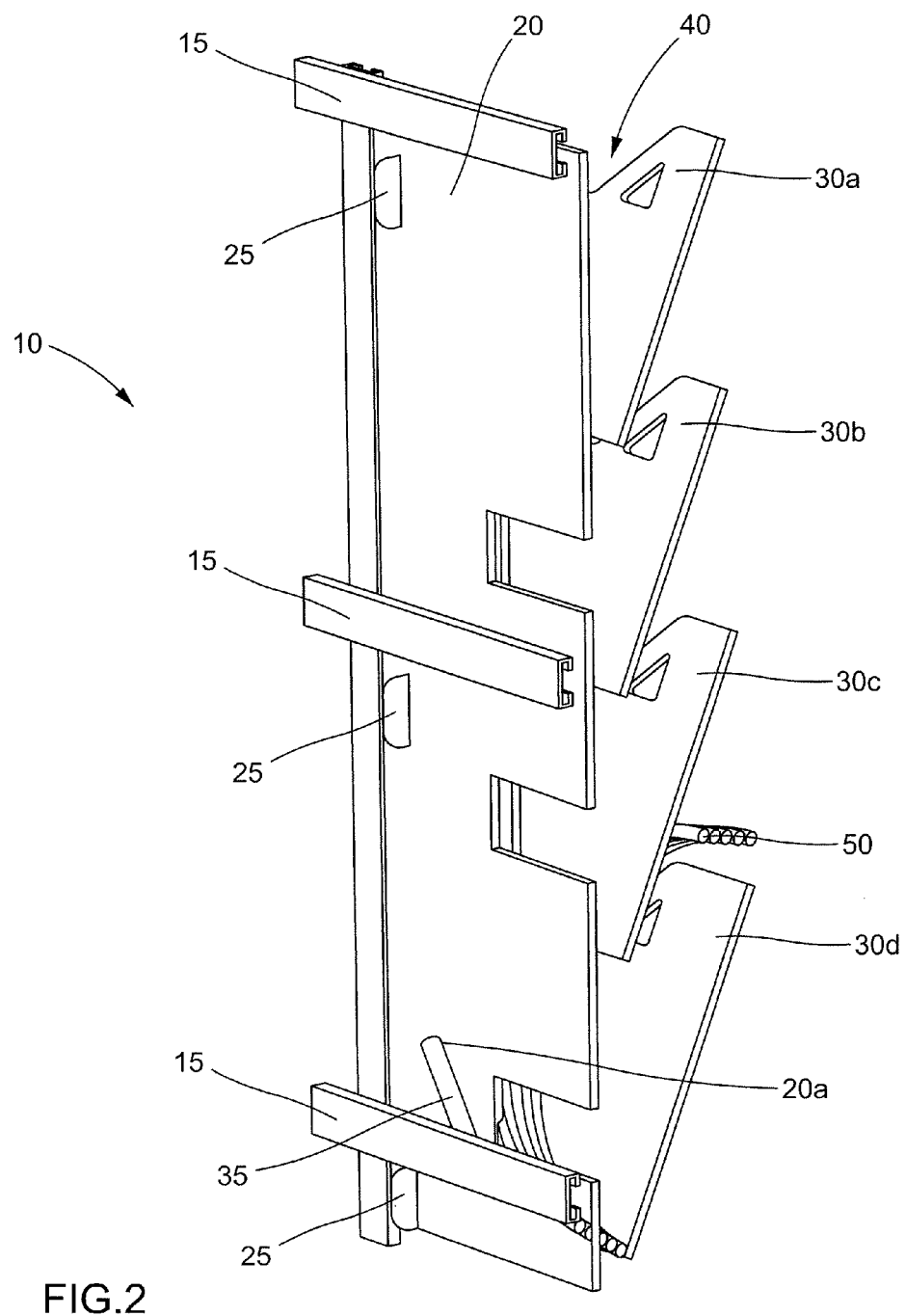
FIG. 2 shows a representative partial cutaway second perspective view of an example coiled tubing storage device/system, in accordance with aspects of the present invention.

In addition, optionally, one or more supports 35 may be included, such as in a generally "V-shaped" (e.g., acute angle) pattern—when two such supports 35 are used with regard to each bin-like unit 40, as viewed in FIG. 2. For example, such supports 35 may be received within slots 31 formed within the shelf structures 30a-30d and/or corresponding slots (see, e.g., slot 20a shown in FIG. 2) formed in the rear support feature 20. The V-shaped pattern may, for example, help secure received coil tubing (see, e.g., cutaway view of sample coil 50 supported by support 35, as shown in FIG. 1) from excess sliding and/or damage. In one variation, the greatest width of the V-shaped opening (measured horizontally from the shelf structures 30a-30d to the rear support feature 20) may be about 6½ inches to accommodate coiled tubing ranging in diameter from about ⅞ inch to 4 inches.

In some variations, the rear support feature 20 may include multiple sub-portions, attachable to one another or relative to one another (e.g., via attachment to rack support features 15). The side structures 25 may likewise include multiple sub-portions, attachable to one another or relative to one another (e.g., via attachment to corresponding sub-portions of rear support feature 20 or to rack support features 15). As a result, the device/system 10 may be modular, allowing any suitable number of bin-like units 40 to be formed, in a ladder-like manner, for example.

In some modular system variations, the width of the sub-portions may vary, for example, from larger widths at lower levels to smaller widths at higher levels, in a "stair-step" manner, for holding sequentially larger to smaller tube sizes, having corresponding overall larger to smaller coil diameters.

FIG. 2 shows another representative partial cutaway perspective view of the example coiled tubing storage device/system of FIG. 1 (perspective from the rear of the device/system 10, compared to as shown in FIG. 1).

In the example variation of FIGS. 1 and 2, the rack support 15 may, for example, be secured within a vehicle (e.g., by attachment to a wall within the vehicle), and the bin-like units 40 may be formed by attachment to the rack support 15, such as by securing the units by nuts and bolts, or by other suitable methods and devices, such as via one or more tabs extending from various features (e.g., side structures 25) being inserted into corresponding receiving opening(s) in the rack support 15. In addition, the number and size of the bin units may be assembled in a modular fashion, such that only the required number of bins are created, as needed, and so that assembly and disassembly is facilitated.

In operation, the bin-like units 40 may each retain one type of coiled tubing 50 (e.g., tubing of one selected pipe cross-sectional diameter, typically having an overall coil diameter that varies according to the tube cross-sectional diameter size—e.g., smaller tubing is typically coiled at a smaller coil diameter than the diameter of coils for larger size tubing), which provides for easy identification and access to each type of coiled tubing 50. In addition, the separate bin-like units 40 may protect each coil type contained therein, for example, by separating the coil tubing 50 and preventing scratching, denting, and other damage among the coiled tubing 50 that is typical of storage methods and features of the prior art (e.g., stacking coils; roping or otherwise attaching coils to one another and/or to a hook or hooks in the vehicle).

Some variations in accordance with aspects of the present invention include additional features relating to the securing and use of both coiled tubing and typical items used with such tubing, such as soldering/welding materials and other items. In addition, coils may be further secured within the bins, for example, such as by providing removable securing features (e.g., Velcro® straps or other selectively securable features to secure the coils while within the bin-like portions).

Figure 3:
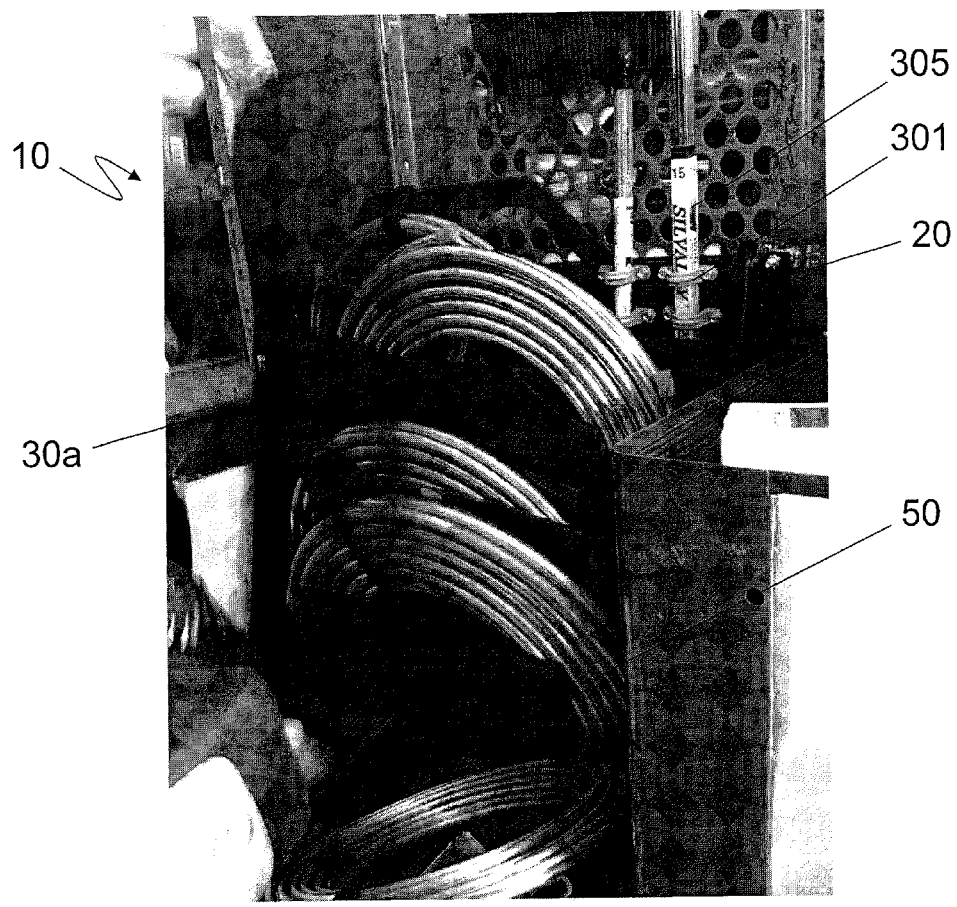
FIG. 3 shows a first Photostat of another example coiled tubing storage device/system, in accordance with aspects of the present invention.

FIGS. 3-6 show various Photostat views of another example coiled tubing storage device/system, in accordance with aspects of the present invention. FIG. 3 shows a perspective view of an example device/system 10, in which the components forming the bin-like units 30a comprise a malleable or semi-malleable material, such as plastic. Also shown in this example configuration are stored samples of copper tubing 50 of different tube diameters, separated by bin. In addition, this example device/system 10 includes features for holding soldering/welding rods, securable to the device/system via securing features (e.g., metal retainers 301 for holding rod containers 305 fastened to one of the bin walls or the rear support feature 20).

Figure 4:
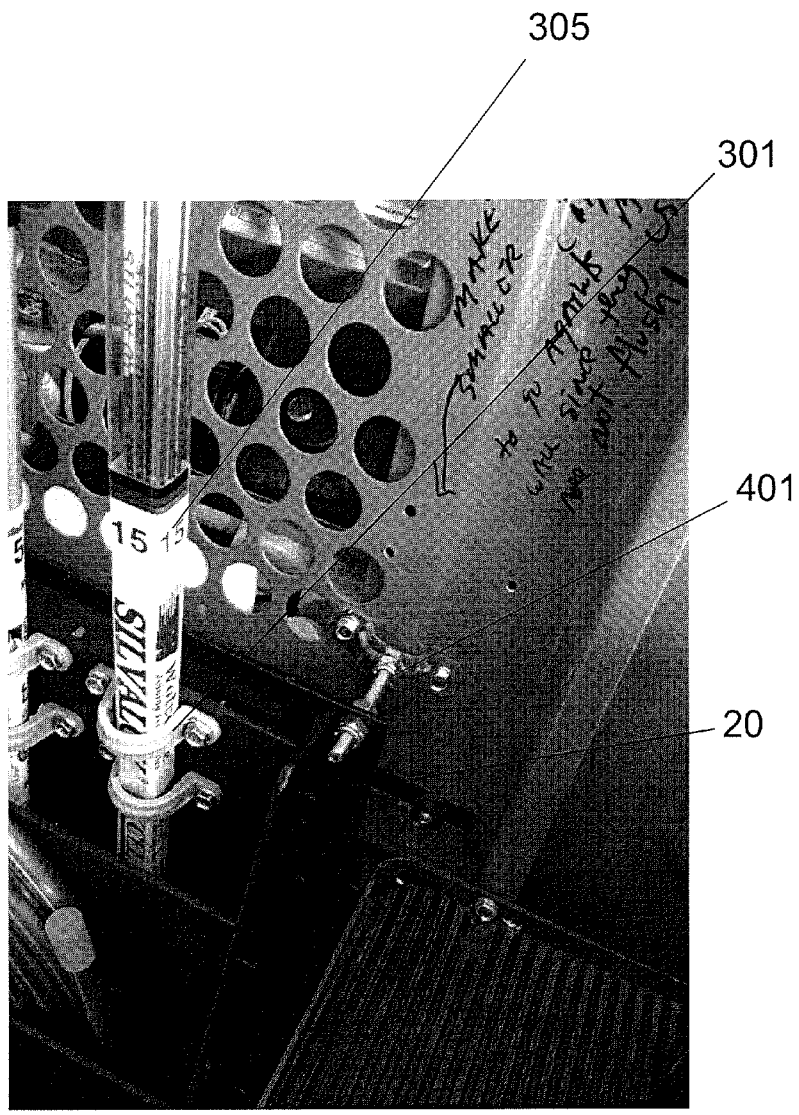
FIG. 4 shows a second Photostat of another example coiled tubing storage device/system, in accordance with aspects of the present invention.

FIG. 4 contains a close-up view of a portion of the device/system of FIG. 3, including a view of an example rack support securing feature 401 attaching the device/system to another component within a vehicle (e.g., a metal dividing wall contained within a vehicle). FIG. 4 also shows a close-up view of the features for storing other items, such as soldering/welding rods, via metal retainers 301 for holding rod containers 305 fastened to one of the bin walls or the rear support feature 20.

Figure 5:
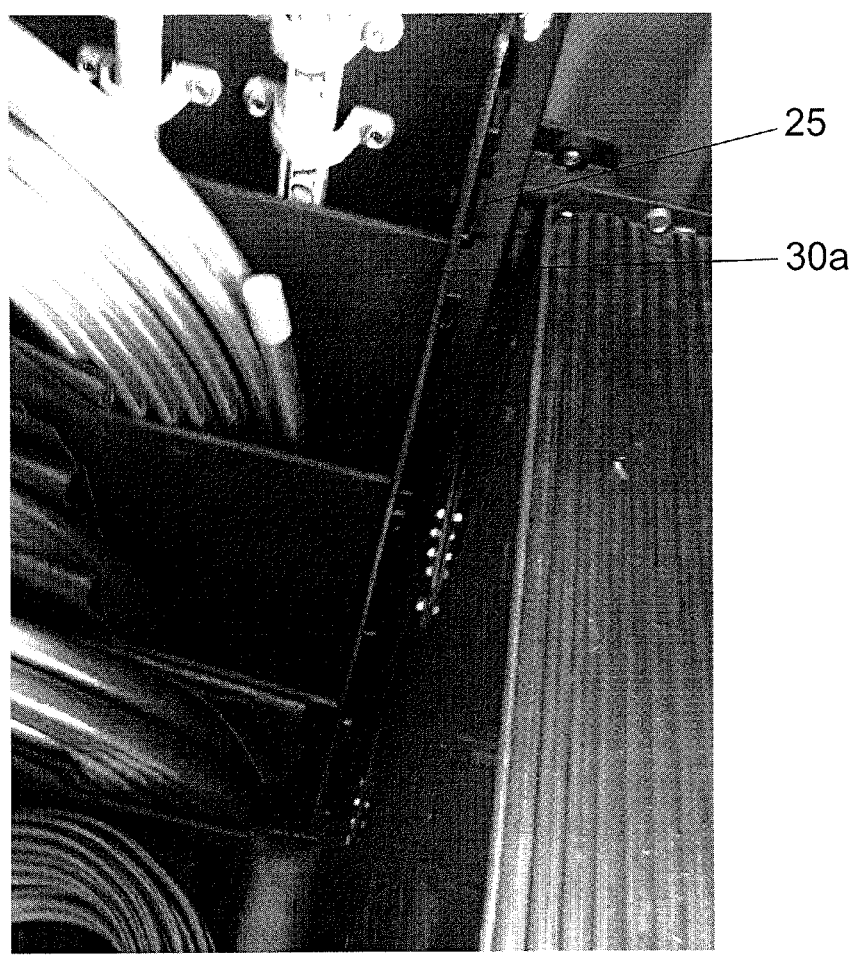
FIG. 5 shows a third Photostat of another example coiled tubing storage device/system, in accordance with aspects of the present invention.

FIG. 5 contains a close-up view of another portion of the device/system of FIG. 3, including a view of one of the side structures 25 that support the shelf structures 30a.

Figure 6:
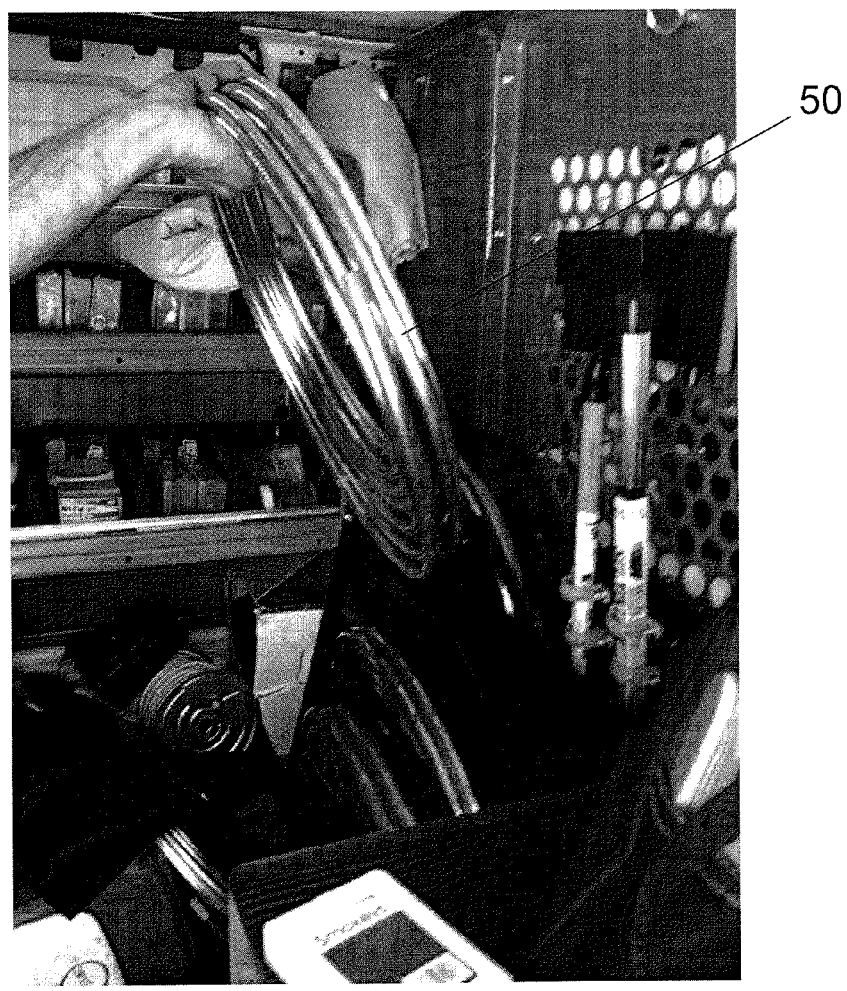
FIG. 6 shows a fourth Photostat of another example coiled tubing storage device/system, in accordance with aspects of the present invention.

FIG. 6 contains another perspective view of the device/system of FIG. 3, showing a coiled tubing sample 50 being removed from/inserted into a bin portion of the device/system.

Example aspects of the present invention have now been described in accordance with the above advantages. It will be appreciated that these examples are merely illustrative hereof. Many variations and modifications will be apparent to those skilled in the art.

The invention claimed is:

1. A system for storing a plurality of coiled tubes, the system comprising:
    a rear support structure;
    at least one side structure attached to the rear support structure;
    a plurality of shelf structures, each of the plurality of shelf structures having at least one end edge and at least one side edge;
    wherein each of the plurality of shelf structures is secured at a first one of the at least one side edge to a first one of the at least one side structure;
    wherein each of the plurality of shelf structures forms a receiving trough with the rear support structure, the receiving trough having an acute angle cross-section formed by each of the plurality of shelf structures and the rear support structure; and
    wherein each formed receiving trough is configured to supportively receive at least one of the plurality of coiled tubes, such that at least a portion of each coiled tube is visible, and such that each coiled tube is readily retrievable from the receiving trough; and
    at least one angled support intersecting the rear support structure and one of the plurality shelf structures, such that each received coiled tube is supported by the at least one angled support.

2. The system of claim 1, wherein each of the plurality of shelf structures is secured at a first one of the at least one end edge to the rear support structure.

3. The system of claim 1, wherein the rear support structure is secured to a vehicle.

4. The system of claim 1, further comprising:
at least one retainer securable to the rear support structure or to one of the plurality of shelf structures, the at least one retainer being configured to retain a container.

5. The system of claim 4, wherein the container is configured to hold brazing rods.

6. The system of claim 1, wherein the plurality of coiled tubes include at least one copper tube.

7. The system of claim 1, wherein the receiving trough has a generally v-shaped cross section.

8. The system of claim 7, wherein at least one of the v-shaped cross sections has a maximum width of about 6½ inches.

9. The system of claim 1, wherein the plurality of shelf structures are configured in a stair step arrangement.

10. The system of claim 1, further comprising:
one or more removable securing features for securing at least one of the plurality of coiled tubes within the receiving trough.

11. A modular system for storing a plurality of coiled tubes, the modular system comprising:
a rear support structure;
at least one side structure attached to the rear support structure;
a plurality of shelf structures, each of the plurality of shelf structures having at least one end edge and at least one side edge;
wherein each of the plurality of shelf structures is secured at a first one of the at least one side edge to a first one of the at least one side structure;
wherein each of the plurality of shelf structures forms a receiving trough with the rear support structure, the receiving trough having an acute angle cross-section formed by each of the plurality of shelf structures and the rear support structure;
wherein the number of the plurality of shelf structures secured to the at least one side structure is selectively variable; and
wherein each formed receiving trough is configured to supportively receive at least one of the plurality of coiled tubes, such that at least a portion of each coiled tube is visible, and such that each coiled tube is readily retrievable from the receiving trough; and
at least one angled support intersecting the rear support structure and one of the plurality shelf structures, such that each received coiled tube is supported by the at least one angled support.

\* \* \* \* \*